United States Patent [19]
Chapman

[11] Patent Number: 5,419,953
[45] Date of Patent: May 30, 1995

[54] MULTILAYER COMPOSITE AIR FILTRATION MEDIA

[76] Inventor: Rick L. Chapman, 1977 Valley Meadow, Oak View, Calif. 93022

[21] Appl. No.: 66,399

[22] Filed: May 20, 1993

[51] Int. Cl.$^6$ .............................. B32B 5/06
[52] U.S. Cl. ..................... 428/284; 55/486; 95/57; 95/69; 95/70; 96/15; 96/17; 96/55; 96/57; 96/58; 96/69; 428/109; 428/287; 428/297; 428/298; 428/300; 428/903
[58] Field of Search ............... 418/282, 280, 300, 284, 418/287, 296, 109, 903, 297, 298; 95/57, 69, 70; 96/15, 69, 17, 55, 57, 58; 55/486

[56] References Cited

U.S. PATENT DOCUMENTS 4,798,850 1/1989 Brown ..................... 521/134
4,874,399 10/1989 Reed et al. ................... 95/57

Primary Examiner—James J. Bell

[57] ABSTRACT

A composite filter media is formed of a plurality of layers. A central layer of electrostatically charged material formed of a carded mixture of polyolefin fibers such as polypropylene and electro-negative substituted organic resin fibers such as modacrylic acrylonitrile-vinyl, chloridevinylidene chloride copolymer efficiently filter more than 99% of 0.1 to 0.5 micron particles. A flame retardant prefilter layer of polyester removes large particles and a backing of flame retardant linear polyester provides tear resistance. An optional layer of electrostatically charged, melt blown, polyolefin such as polypropylene prevents the central layer from loading up by effectively filtering intermediate sized particles.

13 Claims, 1 Drawing Sheet

MULTILAYER COMPOSITE AIR FILTRATION MEDIA

CROSS REFERENCE TO DISCLOSURE DOCUMENT

The present invention is disclosed in Disclosure Document No. 321,340, filed Nov. 24, 1992.

TECHNICAL FIELD

The present invention relates to air filtration media and, more particularly, this invention relates to a multilayer composite containing as an essential layer an electrostatically charged layer capable of 99.99% efficiency in the removal of 0.1 to 3 micron and larger particles.

BACKGROUND OF THE INVENTION

Air filtration requires efficient removal of large and small particles at high air flow rates. The filter must remove the particles over extended periods of time without loading up and losing permeability. The filter must exhibit low resistance to air flow while having a high filtration efficiency. A particular concern is removal of the particles resulting from the decomposition of tobacco smoke. These particles are in the 0.1 to 5 micron range and are human carcinogens.

The air filtration media must not of itself contribute any irritant or carcinogen to the air stream flowing through the media. Fiberglass filters have been widely used in air filtration systems. However, it is now believed that small fibers or fibrils in the aerosol range (up to 10 microns) that are dislodged from the filter media and enter the air stream are capable of causing lung irritation and possibly lung cancer similar to asbestos fibers.

STATEMENT OF THE PRIOR ART

Organic fiber filter media have been proposed. However, filters containing organic fibers do not have high efficiency. Organic fiber filters in which the fibers carry an electrostatic charge are much more efficient in removing small particles from air streams. An electrostatic organic fiber filter media is disclosed in U.S. Pat. No. 4,798,850, the disclosure of which is expressly incorporated herein by reference. However, these materials do not have adequate fire retardancy and tend to load up with small particles or are perforated by large particles when used as air filtration media in HVAC systems. The organic electrostatic materials are mainly used as disposable cartridge filters in low volume, low velocity applications such as dust helmets, respirators and suction cleaners.

STATEMENT OF THE INVENTION

A composite, air filtration media is provided in accordance with the invention which efficiently removes 0.1 to 0.5 micron particles from high volume, high velocity air streams over extended periods of service. The media of the invention is absent inorganic fibers such as fiberglass that are potential irritants or carcinogens. The media of the invention is totally organic.

The media of the invention includes as an essential component a layer of electrostatically charged, needle-punched, non-woven fabric capable of 99.9+% efficiency in the removal of particles from 0.1 to 0.5 microns such as a mixture of polyalkylene fibers such as polypropylene and of anionically substituted acrylic fibers. A flame retardant layer of nonwoven fabric such as a polyester is placed on the incoming air stream side of the charged layer to provide flame retardancy and to capture large particles which would otherwise perforate the non-woven fabric or load up the fabric and reduce the air flow through the filter media.

An optional layer of a melt-blown electrostatically charged olefin polymer such as polypropylene can be provided on either or both sides of the non-woven, charged fabric layer to retain intermediate size particles by mechanical and electrostatic action. A base layer such as a non-woven, flame retardant spun bond polyester provides structural rigidity, strength and tear resistance to the assembly of layers.

The layers can be assembled in a frame which holds the layers together. It is preferred to mechanically join the layers into a unitary assembly so that the assembled composite can be cut into shape and is more easily handled, stored and shipped. If the layers are all thermoplastic the layers can be thermally welded by heat, infrared or sonic welding. The layers can also be adhesively secured. However, the welding and adhesive procedures are difficult to implement and may cause fibers to melt and flow reducing the permeability of the composite. The preferred method of joining the layers together is to needle punch the assembly of layers to provide a plurality of points in which the fibers of the layers interlock to hold the layers and the assembly together without reducing the permeability of the composite.

Composite fiber media of the invention has been assembled and tested and has been formed to efficiently remove small and large particles from high volume and high velocity airstreams.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
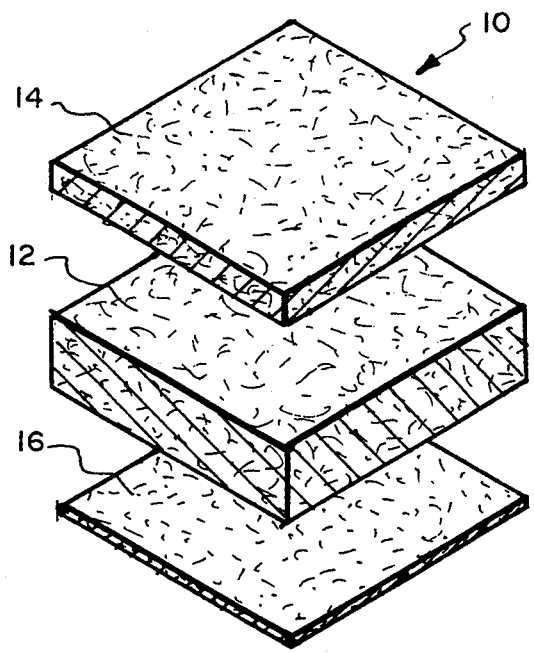
FIG. 1 is an exploded view in perspective of the composite filter media of the invention.
Figure 2:
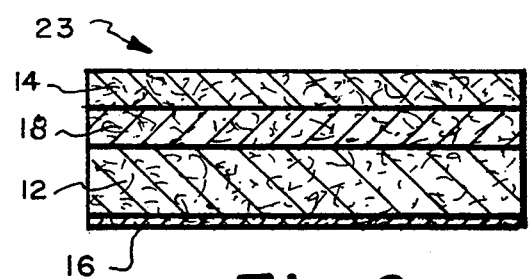
FIG. 2 is a side view in elevation of a 4 layer composite.
Figure 3:
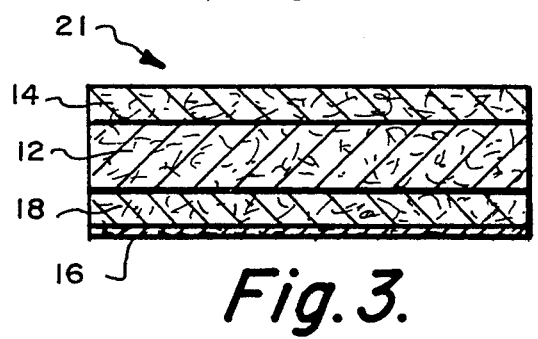
FIG. 3 is a side view in elevation of an alternate embodiment of a 4 layer composite.

Referring now to FIG. 1, the composite media 10 contains an electrostatically charged intermediate layer 12 capable of 99.9+% efficiency in the removal of particles sized from 0.1 to 0.10 microns, an adjacent top layer 14 that is a fire retardant layer capable of capturing large particles and a backing or base layer 16 that provides structural rigidity. As shown in FIG. 2 the composite media 23 may optionally contain a further layer 18 between the top layer 14 and the intermediate layer 12 or as shown in FIG. 3 the composite media 21 may contain layer 18 between the intermediate layer 12 and the backing 16. The optional layer 18 is electrostatically charged and is capable of capturing intermediate sized particles both by mechanical forces and by electrostatic attraction.

Figure 4:
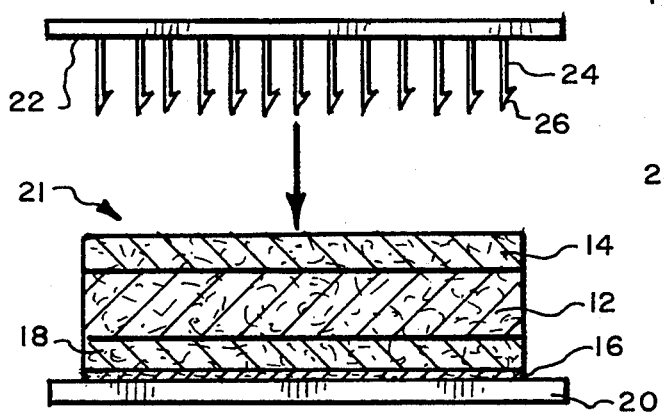
FIG. 4 is a side view of the assembled filter media disposed below a needle punch.
Figure 5:
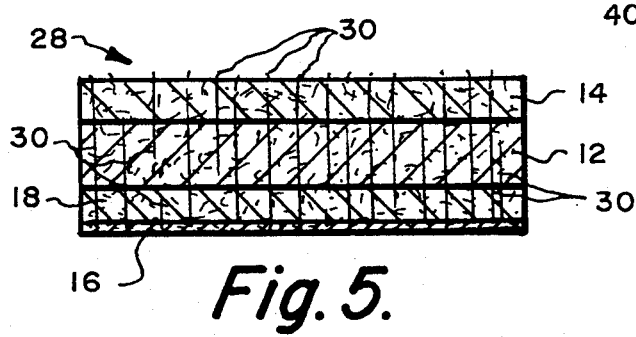
FIG. 5 is a view in section taken after needle punching is completed.

The layers of the composite media are laminated or adhered together to form a unitary assembly. The layers can be thermally bonded, adhesively bonded or mechanically bonded. Mechanical bonding by needle punching is preferred. Referring now to FIGS. 4 and 5, needle punching of the composite media 21 of FIG. 3 is illustrated. The media 21 is placed on an apron 20 below a loom 22 supporting an array of needles 24 containing barbs 26. As the loom is vertically reciprocated, the needles 24 penetrate the 4 layers of the media 21. The barbs engage fibers and carry them into locking engagement with fibers in other layers. As shown in FIG. 5, the needle punched assembly 28 contains a plurality of points 30 in which the fibers of the 3 or 4 layers are engaged.

Figure 6:
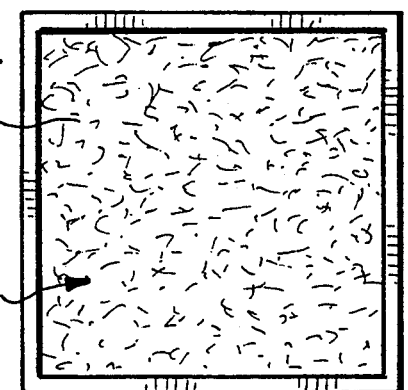
FIG. 6 is a top view of a filter incorporating the laminated media assembled in a frame.
Figure 7:
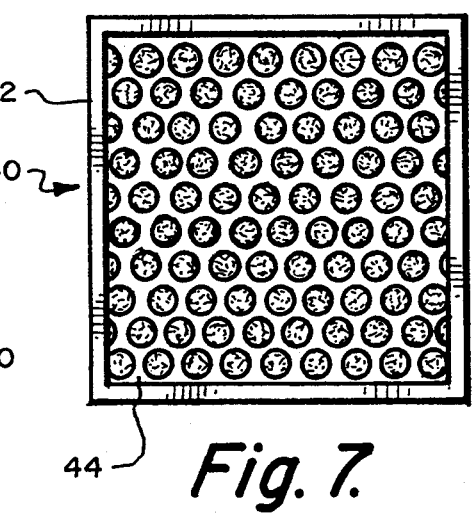
FIG. 7 is a rear view of the filter as shown in FIG. 6.

The needle-punched fiber media 28 is usually installed in a frame 40 as shown in FIGS. 6 and 7. The frame has edge members 42 and may include a retaining and holding screen 44 which can include folds, not shown. The screen 44 is a mesh typically formed of expanded metal.

The air filtration media of the invention is at least 90% efficient in removing particles from 0.1 to 3 microns and larger at a velocity at 10 ft per minute. The media does not contain fiberglass or asbestos. It is 100% formed of synthetic fiber, yet it is fire retardant in a composite form. The dust holding capacity is 2 to 3 times that of commercially available filter media. The filter media of the invention is also stiffer than commercially available filter media which permits fabrication into pleated or folded configurations with less supporting structure to hold the pleats in position and therefore better air flow.

The central electrostatic filter layer 12 is formed of two different fibers which develop electrostatic charge when they rub each other during blending. The filter material is formed of a blend of an olefin polymer with substituted olefin polymer carrying electro-negative substituents such as halogen or CN. The olefin polymer can be polyalkylene polymer formed by addition polymerization of an olefin such as ethylene, propylene butylene or their mixtures. The preferred olefin polymer is polypropylene. Examples of substituted addition polymers are polyvinyl chloride, polyvinylidine chloride, chlorinated polyvinyl chloride, polytetraflourethylene or modacrylic. A modacrylic is a copolymer containing 35 to 90 weight percent acrylonitrile, the remainder being a copolymerzible addition commonomer such as vinyl, vinylester, vinyl chloride or vinylidene chloride.

The preferred modacrylic fiber contains at least 40%, preferably at least 50% by weight of acrylonitrile, the balance being vinyl or vinylidene chloride. Commercially available modacrylic fibers contain 45% acrylonitrile/55% vinyl chloride/or 48% acrylonitrile/50% vinylidene chloride/ 2% third monomer to provide dye sites.

Both fibers are absent any lubrication, anti-static agent or other coating and are both preferably crimped. The ratio of the olefin fiber to the modacrylic fiber is from 30:70 to 80:20 based on surface area, usually from 40:60 to 70:30. The fibers are usually less then 100 micrometers in diameter, usually from 10–25 micrometers. The stable length is from 30 to 200 mm, preferably 40 to 100 mm.

The fibers are formed into a felt by carding the fibers into a fleece and needle punching the fibers to form a felt. The fibers become mixed and develop electrostatic charge during carding.

Technostat electrostatic media is commercially available. The media comprises a blend of polypropylene and modacrylic crimped staple fibers. The media is available in several densities stated as ounces per square yard (OPSY). Specification of several materials follow.

TABLE 1

| MEDIA | WEIGHT | THICKNESS |
|---|---|---|
| Technostat-90 | 3.0 +/− .5 OPSY | 0.75 +/− .015" |
| Technostat-150 | 4.5 +/− 0.5 OPSY | .090 +/− .015" |
| Technostat-250 | 7.0 +/− 1.0 OPSY | .130 +/− .202" |
| Technostat-300 | 9.0 +/− 1.0 OPSY | .145 +/− .020" |
| Technostat-400 | 12.0 +/− 1.0 OPSY | .155 +/− .020" |

| MEDIA | MINIMUM EFFICIENCY | MAXIMUM PENETRATION | MAXIMUM RESISTANCE |
|---|---|---|---|
| Technostat-90 | 90% | 10% | 1.0 |
| Technostat-150 | 97.00% | 3.00% | 2.0 |
| Technostat-250 | 99.93% | 0.07% | 4.0 |
| Technostat-300 | 99.97% | 0.03% | 5.0 |
| Technostat-400 | 99.99% | 0.01% | 6.0 |

The top layer 14 is a prefilter spaced from the central layer and designed to remove particles greater than 10 microns from the air stream. The top layer is also fire-retardant. A needle-punched fire retardant, linear polyester breather felt having a weight from 106 OPSY is suitable for this layer. A 4 OPSY, flame retardant, polyethylene terethalate having a thickness of about 0.065 inches and a melting point of 475° F. has been found suitable for this purpose. The backing layer 16 can be a very thin, spiral bound, non-woven polyester having a density of 0.1 to 1.0 OSPY. A suitable material is spunbound, non-woven linear polyethylene trephthalate having a weight of 0.4 OPSY.

The 3-layer assembly may not efficiently remove all the small particles from an air stream or may load up sooner than desired. Air containing residues from tobacco smoke can coat the fibers with oil or resin. The presence of a further electrostatically charged organic layer which captures 20–40% of the intermediate sized particles (0.1 to 10 microns) while maintaining low air resistance. This material removes the particles both by electrostatic collection and mechanically capturing the particles. The optional layer can be an electrostatically charged, melt blown polypropylene material having a basis by weight of 5–15 g/m$^2$, a thickness of 1 to 10 mil, a DOP smoke penetration of 30–70% at 0.3 m @ 10.5 ft/minute, air flow resistance of 0.2–0.8 mm H$_2$O inches @ 10.5 ft/minutes and an air permeability of 100–400 ft/min/ft$^2$ @ 0.5 inch H$_2$O W.G. Tensile strength is about 0.5–0.7 inch in both directions.

Organic composite filter media were prepared for testing by the following procedure. A Fehrer, model NL-9S needle loom, 3.5 meters wide with downstroke needle barbs containing 5000 needles per meter (130 per inch) was utilized.

A roll of the flame retardant needed punched nonwoven polyester was placed on horses in front of the apron which feeds into the needle loom. The material was rolled onto the apron. The remaining layers were rolled out on top of each other in flush arrangement.

The apron speed and loom strokes were set to equal 100 penetrations per square inch. The needle penetrations were set such that the first barb on the material just penetrates the first layer, the needle punched, non-woven polyester in this case. The line is started and all 3 or 4 layers are neatly woven together by needle punching to form a roll of assembled, composite media.

EXAMPLE 1

The following materials were assembled and needle punched as described above.

| First Layer Prefilter | 4 OPSY, Flame Retardant, needle punched, non-woven polyethylene terephthalate |
|---|---|
| Smoke Prefilter Layer | Non-woven, melt blown, electro-statically charged polypropylene |
| Third Layer | 12 OPSY Technostat |
| Backing Layer | 0.4 OPSY, Blue Tinted, Spun Bonded, Non-woven, polyethylene terephthalate |

The resulting filter media was placed in a frame and tested against an airstream flowing at 10.5 ft/min. Results follow.

| Particle Size, Microns | Efficiency % |
|---|---|
| 0.1 | 99.93 |
| 0.2 | 99.98 |
| 0.3 | 99.98+ |
| 0.5 | 99.93/99.996 |

EXAMPLE 2

The Technostat material of the composite filter media Example 1 was replaced with 6.0 OPSY material. The efficiency of this filter media follows.

| Particle Size, Microns | Efficiency |
|---|---|
| 0.1 | 99.53 |
| 0.2 | 99.81 |
| 0.3 | 99.62 |
| 0.5 | 99.93/99.996 |

EXAMPLE 3

The layer of melt blown polypropylene was moved to the other side of the Technostat material. The efficiencies were about the same.

The composite media of the invention are found to be readily fabricated, easy to handle and are totally effective in filtering 0.1 to 0.5 micron particles from airstreams. The media removes 2 to 3 times more dust than commercial filters. Other material such as wool felt can be used for the prefilter and other screens such as Nylon (linear polyamide) can be used. However, these materials illustrated are found to provide a well-functioning product and a product meeting air filtering and flame retardant standards.

EXAMPLE 4

The Technostat material of Example 1 was replaced with 9.25 OPSY material. A 12 such filter was 99.9% efficient at 0.1 to 0.3 microns and a 6 inch filter was 99% efficient at 0.1 to 0.3 microns.

EXAMPLE 5

The Technostat material of Example 1 was replaced with 4.75 OPSY material. A 12 inch filter was 98% efficient at 0.1 to 0.3 microns. A 6 inch filter 90% efficient at 0.1 to 0.3 microns.

EXAMPLE 6

A needle punched filter media was prepared from 10 OPSY fire retardant polyester, a layer of electrostatically charged polypropylene, 6.5 OPSY Technostat and 0.4 OPSY polyester scrim backing. The media was fabricated into a filter with 4 inch pleats. The filter was 99% plus efficient at 0.3 microns and 99.97% efficient at 0.5 microns. The filter had very high dust holding capacity.

It is to be realized that only preferred embodiments of the invention have been described and that numerous substitutions, modifications and alterations are permissible without departing from the spirit and scope of the invention as defined in the following claims.

I claim:

1. A composite air filter media comprising:
   a first, main layer of electrostatically charged, synthetic organic resin fibers capable of filtering more than 90% of 0.1 to 0.5 micron particles from a flowing airstream;
   a second, prefilter layer of flame retardant synthetic organic resin capable of efficiently removing particles larger than 10 microns from said flowing air stream, disposed on a first side of said first layer; and
   a backing layer of flame retardant, non-woven, synthetic organic resin having good tear resistance disposed on a second side of said first layer.

2. A composite media according to claim 1 including a further layer adjacent said first layer, said further layer being formed of an electrostatically charged, polyolefin, non-woven, melt blown material and being capable of removing from 30% to 50% of particles having a size from 0.3 to 10 microns from said air stream.

3. A composite media according to claim 2 in which the further layer is disposed between said first and second layers.

4. A composite media according to claim 3 in which the further layer is disposed between the first layer and the backing layer.

5. A composite media according to claim 2 in which said layers are physically adhered together to form an assembly.

6. A composite media according to claim 5 in which said layers are adhered by needle punching.

7. A composite media according to claim 1 in which the first layer is a mixture of polyolefin fibers and fibers of an organic resin containing an electro-negative group.

8. A composite media according to claim 7 in which the electro-negative group is selected from nitrile and halogen.

9. A composite media according to claim 8 in which the polyolefin is selected from polyethylene, polypropylene or polybutylene and the organic resin fiber is a copolymer of acrylonitrile and a vinyl chloride or vinylidene chloride comonomer.

10. A composite media according to claim 9 in which the first layer has a weight from 1 to 30 ounces per square yard.

11. A composite media according to claim 10 in which the second layer is a flame retardant linear polyester having a weight form 1 to 15 ounces per square yard.

12. A composite media according to claim 2 in which the further layer is a non-woven, melt blown, polypropylene material in which the fibers having a diameter of no more than ½ that of the fibers of the first layer and having a weight from 1 to 15 ounces per square yard.

13. A composite media according to claim 11 in which the backing layer is a flame resistant, spun bonded, non-woven, linear polyester scrim having a weight from 0.1 to 1.0 ounces per square yard.

* * * * *